US012698820B2

(12) United States Patent
Tsubakino et al.

(10) Patent No.: US 12,698,820 B2
(45) Date of Patent: Aug. 4, 2026

(54) TOOTHED BELT

(71) Applicant: BANDO CHEMICAL INDUSTRIES, LTD., Hyogo (JP)

(72) Inventors: Kazuyuki Tsubakino, Iwade (JP); Masahiro Shindo, Izumisano (JP); Hironori Yamaguchi, Izumisano (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

(21) Appl. No.: 18/993,221

(22) PCT Filed: Jul. 5, 2023

(86) PCT No.: PCT/JP2023/024999
§ 371 (c)(1),
(2) Date: Jan. 10, 2025

(87) PCT Pub. No.: WO2024/024435
PCT Pub. Date: Feb. 1, 2024

(65) Prior Publication Data
US 2025/0354602 A1 Nov. 20, 2025

(30) Foreign Application Priority Data
Jul. 28, 2022 (JP) ................................. 2022-120304

(51) Int. Cl.
F16G 1/28 (2006.01)

(52) U.S. Cl.
CPC ...................................... F16G 1/28 (2013.01)

(58) Field of Classification Search
CPC .................. F16G 1/16; F16G 1/28; F16G 1/10
See application file for complete search history.

(56) References Cited

U.S. PATENT DOCUMENTS 4,702,729 A * 10/1987 Tanaka ...................... F16G 1/28
474/251
4,838,843 A * 6/1989 Westhoff ................ B29D 29/08
474/205

(Continued)

FOREIGN PATENT DOCUMENTS

EP 3626998 A1 3/2020
JP 10-148238 A 6/1998

(Continued)

OTHER PUBLICATIONS

International Search Report issued in WIPO Patent Application No. PCT/JP2023/024999, dated Aug. 15, 2023, along with an English translation thereof.

(Continued)

*Primary Examiner* — Henry Y Liu
(74) *Attorney, Agent, or Firm* — Greenblum & Bernstein, P.L.C.

(57) ABSTRACT

A toothed belt includes: a belt body having a plurality of tooth portions provided on a belt inner circumference at a constant pitch; and a cord embedded in the belt body so as to have a pitch in a belt width direction, and a peak friction coefficient $\mu A$ and an average friction coefficient $\mu B$ measured by the following method have a relationship of $\mu A - \mu B \leq 0.3$ and $\mu B \leq 0.5$. The toothed belt is cut in the width direction to cut out a measurement sample having two belt teeth from the toothed belt, the measurement sample is placed on a flat plate made of SUS304 such that tooth tips thereof are in contact with the flat plate while a constant load is applied thereto, a friction force when the measurement sample is moved at a speed of 100 mm/min in one direction for 30 seconds is measured.

4 Claims, 10 Drawing Sheets

(56) References Cited

U.S. PATENT DOCUMENTS

| | | | | |
|---|---|---|---|---|
| 4,840,608 | A * | 6/1989 | Araki | F16G 1/28 474/205 |
| 5,112,282 | A * | 5/1992 | Patterson | F16G 5/20 474/260 |
| 5,611,745 | A * | 3/1997 | Uto | F16G 1/28 474/267 |
| 5,807,194 | A * | 9/1998 | Knutson | B29D 29/08 474/237 |
| 5,853,849 | A * | 12/1998 | Nishio | B32B 3/10 474/84 |
| 5,971,879 | A * | 10/1999 | Westhoff | F16G 1/28 474/260 |
| 6,007,897 | A * | 12/1999 | Tamaki | F16G 1/28 474/271 |
| 6,296,588 | B1 * | 10/2001 | Ciemniecki | F16G 1/28 474/268 |
| 6,419,775 | B1 * | 7/2002 | Gibson | B32B 7/12 156/137 |
| 6,485,384 | B1 * | 11/2002 | Ochiai | F16H 7/023 474/204 |
| 6,572,505 | B1 * | 6/2003 | Knutson | D04B 1/225 474/263 |
| 6,739,997 | B2 * | 5/2004 | Di Meco | F16G 1/28 474/260 |
| 6,863,761 | B2 * | 3/2005 | Knutson | F16G 5/20 156/137 |
| 6,926,633 | B2 * | 8/2005 | Di Cesare | F16G 1/28 474/260 |
| 7,041,021 | B2 * | 5/2006 | Gibson | B32B 7/12 474/205 |
| 7,056,249 | B1 * | 6/2006 | Osako | F16G 1/06 474/260 |
| 7,235,028 | B2 * | 6/2007 | Martin | F16G 5/20 474/264 |
| 7,683,136 | B2 * | 3/2010 | Wood | F16G 5/06 524/483 |
| 7,695,386 | B2 * | 4/2010 | Wood | C08K 5/14 474/271 |
| 7,749,118 | B2 * | 7/2010 | Baldovino | F16G 1/28 474/205 |
| 7,759,427 | B2 * | 7/2010 | Wood | F16G 1/28 525/240 |
| 7,842,354 | B2 * | 11/2010 | Wood | C08L 23/16 427/372.2 |
| 7,887,448 | B2 * | 2/2011 | Hineno | F16G 5/06 474/263 |
| 7,985,152 | B2 * | 7/2011 | Di Meco | F16G 1/28 474/271 |
| 8,147,365 | B2 * | 4/2012 | Matsuda | F16G 1/28 474/263 |
| 8,192,316 | B2 * | 6/2012 | Marc | F16G 1/28 442/229 |
| 8,192,797 | B2 * | 6/2012 | Wood | C08K 3/04 427/372.2 |
| 8,357,065 | B2 * | 1/2013 | Duke, Jr. | F16G 5/20 474/205 |
| 8,388,477 | B2 * | 3/2013 | Baldovino | D02G 3/447 474/205 |
| 8,475,309 | B2 * | 7/2013 | Di Meco | B32B 25/10 474/205 |
| 8,568,260 | B2 * | 10/2013 | Baldovino | F16G 1/28 474/271 |
| 8,871,329 | B2 * | 10/2014 | Yoshida | F16G 1/28 428/167 |
| 9,169,896 | B2 * | 10/2015 | Pasch | B29C 43/46 |
| 9,291,237 | B2 * | 3/2016 | Izu | F16G 1/28 |
| 9,322,455 | B2 * | 4/2016 | Di Meco | F16G 1/28 |
| 9,353,827 | B2 * | 5/2016 | Uchigashima | F16G 1/28 |
| 9,441,706 | B2 * | 9/2016 | Gibson | F16G 1/16 |
| 9,481,962 | B2 * | 11/2016 | Wood | D06M 23/08 |
| 9,752,648 | B2 * | 9/2017 | Sakamoto | F16G 1/10 |
| 9,909,647 | B2 * | 3/2018 | Nonaka | C08J 3/203 |
| 9,927,001 | B2 * | 3/2018 | Di Meco | F16H 57/0489 |
| 10,018,248 | B2 * | 7/2018 | Duke, Jr. | F16G 1/16 |
| 10,359,095 | B2 * | 7/2019 | Yoshida | B32B 25/02 |
| 10,408,300 | B2 * | 9/2019 | Sekiguchi | C08L 75/08 |
| 10,508,711 | B2 * | 12/2019 | Di Meco | F16G 1/28 |
| 10,514,083 | B2 * | 12/2019 | Gregg | B29D 29/08 |
| 10,641,355 | B2 * | 5/2020 | Nishiyama | F16G 1/10 |
| 10,687,468 | B1 * | 6/2020 | Wood | B65G 15/36 |
| 10,794,450 | B2 * | 10/2020 | Tsuchiya | F16G 5/08 |
| 10,836,888 | B2 * | 11/2020 | Kobayashi | F16G 1/06 |
| 11,473,648 | B2 * | 10/2022 | Ikeda | C08L 75/04 |
| 11,480,231 | B2 * | 10/2022 | Parziale | F16H 57/0489 |
| 11,566,684 | B2 * | 1/2023 | Meki | F16H 1/28 |
| 11,647,696 | B2 * | 5/2023 | Jäger | B27C 5/06 198/847 |
| 11,885,392 | B2 * | 1/2024 | Mitsutomi | B29D 29/08 |
| 12,209,636 | B2 * | 1/2025 | Hayashi | G06K 19/0723 |
| 12,352,333 | B2 * | 7/2025 | Gao | F16G 1/28 |
| 2002/0015825 | A1 * | 2/2002 | Meco | F16G 1/28 428/421 |
| 2002/0179228 | A1 * | 12/2002 | Gibson | F16G 1/28 156/137 |
| 2002/0187869 | A1 * | 12/2002 | Martin | B29D 29/08 474/263 |
| 2003/0078125 | A1 * | 4/2003 | Knutson | D04B 1/225 474/263 |
| 2003/0083168 | A1 * | 5/2003 | Cipollone | F16G 1/28 474/260 |
| 2003/0211912 | A1 * | 11/2003 | Cesare | F16G 1/28 474/263 |
| 2004/0018906 | A1 * | 1/2004 | Sedlacek | F16G 1/28 474/260 |
| 2005/0090618 | A1 * | 4/2005 | Okuno | C08L 33/20 525/232 |
| 2005/0093205 | A1 * | 5/2005 | Martin | F16G 5/20 156/137 |
| 2005/0113200 | A1 * | 5/2005 | Okuno | F16G 5/166 474/237 |
| 2006/0079362 | A1 * | 4/2006 | Tomobuchi | F16G 1/28 474/260 |
| 2006/0154766 | A1 * | 7/2006 | Lacy | F02B 67/06 474/166 |
| 2006/0174997 | A1 * | 8/2006 | Gibson | B32B 7/12 474/205 |
| 2006/0264289 | A1 * | 11/2006 | Ballhausen | F16G 1/28 474/263 |
| 2006/0287148 | A1 * | 12/2006 | Wood | F16G 1/28 474/263 |
| 2006/0287434 | A1 * | 12/2006 | Wood | C08L 23/30 525/192 |
| 2007/0060431 | A1 * | 3/2007 | Hineno | F16G 5/06 474/263 |
| 2007/0111834 | A1 * | 5/2007 | Matsuda | F16G 1/28 474/237 |
| 2007/0135251 | A1 * | 6/2007 | Di Meco | C09D 127/18 474/260 |
| 2007/0178792 | A1 * | 8/2007 | Yoshida | F16G 1/28 442/293 |
| 2007/0240658 | A1 * | 10/2007 | Baldovino | F16G 1/28 123/90.31 |
| 2007/0281814 | A1 * | 12/2007 | Baldovino | D02G 3/447 474/205 |
| 2008/0004145 | A1 * | 1/2008 | Duke | F16G 1/28 474/205 |
| 2009/0191998 | A1 * | 7/2009 | Di Meco | F16G 1/28 474/153 |
| 2009/0199347 | A1 * | 8/2009 | Wood | B29B 15/105 8/115.6 |
| 2010/0004082 | A1 * | 1/2010 | Di Meco | F16G 1/28 474/205 |
| 2010/0120566 | A1 * | 5/2010 | Izu | F16G 1/28 474/205 |
| 2010/0143598 | A1 * | 6/2010 | Wood | F16G 5/06 526/348 |
| 2010/0196612 | A1 * | 8/2010 | Wood | C08L 23/06 427/389.9 |

(56) References Cited

U.S. PATENT DOCUMENTS

| | | | | |
|---|---|---|---|---|
| 2010/0197435 A1* | 8/2010 | Gewald | F16G 1/28 |
| | | | 474/263 |
| 2010/0240481 A1* | 9/2010 | Baldovino | D02G 3/447 |
| | | | 474/205 |
| 2010/0247787 A1* | 9/2010 | Wood | C08L 23/30 |
| | | | 427/389.9 |
| 2010/0255259 A1* | 10/2010 | Baldovino | B32B 3/30 |
| | | | 524/565 |
| 2010/0304909 A1* | 12/2010 | Baldovino | F16G 1/28 |
| | | | 474/202 |
| 2011/0263367 A1* | 10/2011 | Baldovino | F16G 1/28 |
| | | | 474/204 |
| 2012/0157251 A1* | 6/2012 | Di Meco | F16G 1/28 |
| | | | 156/137 |
| 2012/0192822 A1* | 8/2012 | Rolando | F16G 1/28 |
| | | | 123/90.31 |
| 2012/0252619 A1* | 10/2012 | Uchigashima | F16G 1/10 |
| | | | 474/205 |
| 2013/0059690 A1* | 3/2013 | Di Cesare | F16G 1/28 |
| | | | 474/205 |
| 2013/0153123 A1* | 6/2013 | Pasch | B29C 43/46 |
| | | | 156/138 |
| 2013/0225346 A1* | 8/2013 | Gibson | F16G 1/28 |
| | | | 156/137 |
| 2014/0080647 A1* | 3/2014 | Sakamoto | F16G 1/28 |
| | | | 474/205 |
| 2015/0005123 A1* | 1/2015 | Di Meco | F16G 9/04 |
| | | | 474/205 |
| 2015/0111677 A1* | 4/2015 | Nishiyama | F16G 5/08 |
| | | | 474/264 |
| 2016/0208889 A1* | 7/2016 | Yoshida | B32B 5/02 |
| 2016/0208890 A1* | 7/2016 | Nonaka | C08J 3/203 |
| 2017/0023100 A1* | 1/2017 | Di Meco | F16G 1/28 |
| 2017/0030431 A1* | 2/2017 | Duke, Jr. | F16G 1/04 |
| 2017/0082174 A1* | 3/2017 | Parziale | F16H 57/0489 |
| 2017/0191545 A1* | 7/2017 | Sekiguchi | C08G 18/10 |
| 2017/0299017 A1* | 10/2017 | Gregg | F16G 1/04 |
| 2018/0051772 A1* | 2/2018 | Gregg | B29C 45/1642 |
| 2019/0169349 A1* | 6/2019 | Arimachi | F16G 1/28 |
| 2019/0177889 A1* | 6/2019 | Gao | F16G 5/20 |
| 2019/0178339 A1* | 6/2019 | Gao | F16G 1/28 |
| 2019/0315898 A1* | 10/2019 | Casagrande | C08K 7/14 |
| 2020/0123350 A1* | 4/2020 | Kobayashi | D06M 23/08 |
| 2020/0124135 A1* | 4/2020 | Tsuchiya | C08L 1/02 |
| 2020/0182329 A1* | 6/2020 | Ikeda | F16G 1/28 |
| 2020/0187420 A1* | 6/2020 | Wood | B65G 23/06 |
| 2020/0240488 A1* | 7/2020 | Meki | F16G 1/10 |
| 2020/0378470 A1* | 12/2020 | Parziale | F16H 7/023 |
| 2021/0185935 A1* | 6/2021 | Jäger | F16G 3/12 |
| 2021/0222756 A1* | 7/2021 | Gao | F16G 1/28 |
| 2021/0396297 A1* | 12/2021 | Mitsutomi | C08K 3/22 |
| 2022/0128120 A1* | 4/2022 | Hayashi | G06K 19/07786 |
| 2024/0151293 A1* | 5/2024 | Gao | F16G 5/08 |

FOREIGN PATENT DOCUMENTS

| | | |
|---|---|---|
| JP | 2009-92234 A | 4/2009 |
| JP | 2010-127442 A | 6/2010 |
| JP | 2018-17398 A | 2/2018 |
| JP | 2018-25296 A | 2/2018 |

OTHER PUBLICATIONS

European Search Report in counterpart EP application No. EP23846168.5, dated Jun. 10, 2026.

* cited by examiner

TOOTHED BELT

TECHNICAL FIELD

The present invention relates to a toothed belt.

This application claims priority on Japanese Patent Application No. 2022-120304 filed on Jul. 28, 2022, the entire content of which is incorporated herein by reference.

BACKGROUND ART

As toothed belts used for power transmission applications in machine tools, printing machines, textile machines, injection molding machines, etc., there are toothed belts made of polyurethane (e.g., PATENT LITERATURES 1 and 2).

PATENT LITERATURE 1 discloses a toothed belt that is made of polyurethane and in which a woven or knitted fabric is placed on the tooth portion side with respect to a cord.

PATENT LITERATURE 2 discloses a toothed belt having a belt body composed of a cast urethane belt material, belt teeth formed on the belt body so as to be spaced apart at a predetermined pitch, a reinforcement material of a wear-resistant canvas placed along the peripheral surfaces of the belt teeth, and a tensile member composed of a cord having a length and volume embedded in the belt body and obtained by helically twisting a fiber yarn.

CITATION LIST

Patent Literature

PATENT LITERATURE1: Japanese Laid-Open Patent Publication No. 2010-127442
PATENT LITERATURE 2: Japanese Laid-Open Patent Publication No. H10-148238

SUMMARY OF THE INVENTION

Technical Problem

Toothed belts are required to have excellent durability. Therefore, it is required that belt teeth do not wear early and that peeling does not occur early between a belt body and a cord.

For example, in a toothed belt having a reinforcement fabric provided on the inner circumferential surface of each tooth portion, the tooth portion tends to be less likely to wear. On the other hand, this toothed belt tends to be likely to generate heat when driven, and peeling may occur early between a belt body and a cord due to heat generation.

Solution to Problem

The present invention has been made in view of such circumstances, and an object of the present invention is to provide a toothed belt having good durability.

(1) A toothed belt of the present invention includes:

a belt body having a plurality of tooth portions provided on a belt inner circumference at a constant pitch; and
a cord embedded in the belt body so as to have a pitch in a belt width direction, wherein
a peak friction coefficient $\mu A$ and an average friction coefficient $\mu B$ measured by the following method have a relationship of $\mu A-\mu B \leq 0.3$ and $\mu B \leq 0.5$:

<Measurement Method> the toothed belt is cut in the width direction to cut out a measurement sample having two belt teeth from the toothed belt, the obtained measurement sample is placed on a flat plate such that the belt teeth are in contact with the flat plate, the measurement sample is moved in one direction for 30 seconds in this state, a friction force at this time is measured, a friction coefficient calculated by dividing a maximum value of the friction force for 30 seconds by a normal force is regarded as the peak friction coefficient $\mu A$, and a friction coefficient calculated by dividing an average value of the friction force for 30 seconds by the normal force is regarded as the average friction coefficient $\mu B$, a measurement environment has a temperature of $23 \pm 5°$ C. and a humidity of $50 \pm 5\%$, the measurement sample is placed on the flat plate while a constant load is applied thereto, the flat plate is made of SUS304, and a surface roughness of a surface of the flat plate on which the measurement sample is placed is 1.6 μm or less as Ra (arithmetic mean roughness), and a movement speed of the measurement sample is 100 mm/min.

The toothed belt can ensure good durability.

In the toothed belt, it is important that the peak friction coefficient $\mu A$ and the average friction coefficient $\mu B$ measured by the above-described method satisfy "$\mu A-\mu B \leq 0.3$" and "$\mu B \leq 0.5$" at the same time.

By setting the average friction coefficient $\mu B$ to 0.5 or less, the toothed belt can reduce the friction force generated between pulleys and suppress heat generation during use. In addition, when the friction force generated between the pulleys is reduced, wear of the tooth portions (belt teeth) is also suppressed.

Furthermore, by not only simply decreasing the average friction coefficient $\mu B$ but also setting the difference between the peak friction coefficient $\mu A$ and the average friction coefficient $\mu B$ to 0.3 or less, the toothed belt can further suppress wear of the tooth portions (belt teeth).

(2) In the toothed belt of (1) above, preferably, a reinforcement fabric is provided on inner circumferential surfaces of the tooth portions.

This case is suitable for improving the wear resistance of the belt teeth.

(3) In the toothed belt of (1) or (2) above, preferably, the belt body is made of thermosetting polyurethane.

This case is suitable for providing a toothed belt having good durability.

(4) In the toothed belt of (3) above, preferably, the belt body contains a lubricant.

In this case, it is easier to set the peak friction coefficient $\mu A$ and the average friction coefficient $\mu B$ in the above range.

Advantageous Effects of the Invention

According to the present invention, it is possible to provide a toothed belt having good durability.

DETAILED DESCRIPTION

Hereinafter, embodiments of the present invention will be described with reference to the drawings. The present invention is not limited to these embodiments.

First Embodiment

Figure 1:
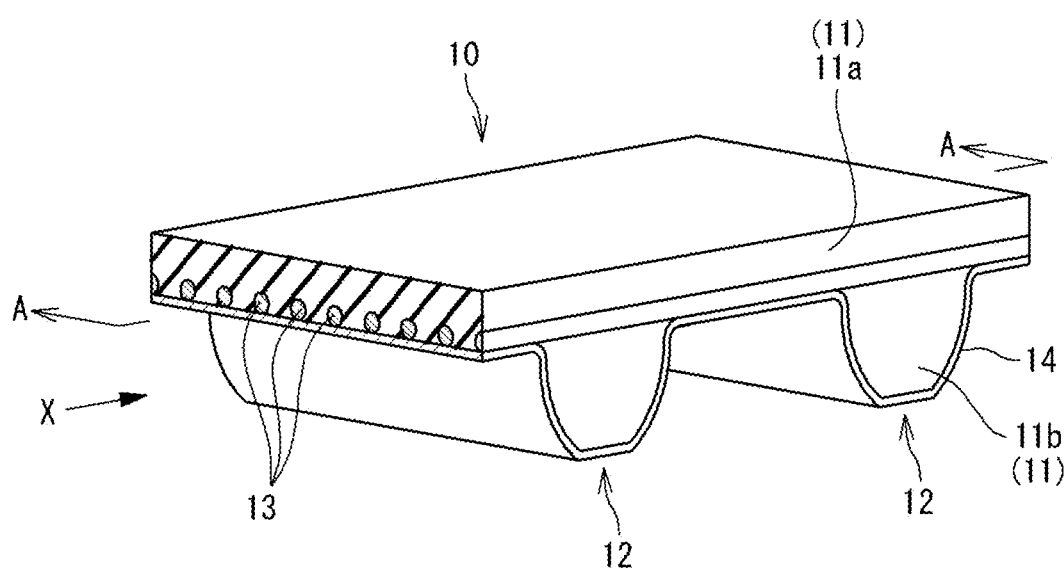
FIG. 1 is a perspective view schematically showing a toothed belt according to a first embodiment.
Figure 2:
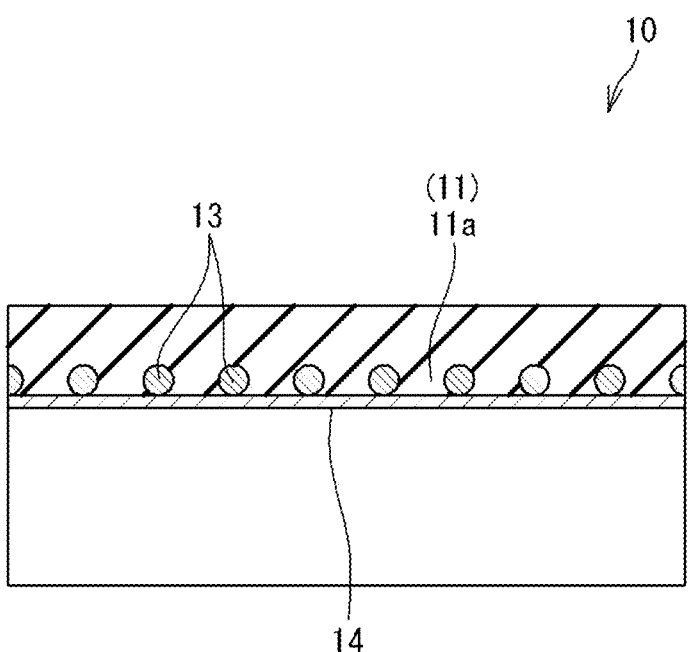
FIG. 2 is a front view as seen in the direction of an arrow X in FIG. 1.
Figure 3:
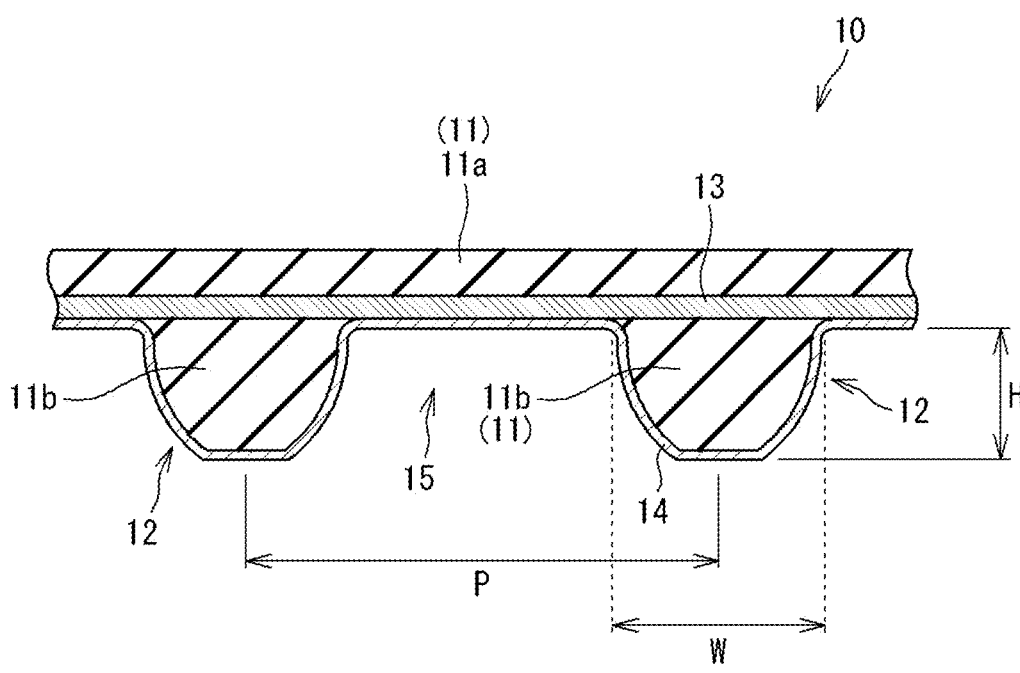
FIG. 3 is a cross-sectional view taken along a line A-A in FIG. 1.

FIG. 1 is a perspective view schematically showing a toothed belt according to a first embodiment. FIG. 2 is a front view as seen in the direction of an arrow X in FIG. 1. FIG. 3 is a cross-sectional view taken along a line A-A in FIG. 1.

The toothed belt 10 according to the present embodiment is suitably used for high-load transmission applications, such as machine tools, printing machines, textile machines, injection molding machines, and rear-wheel drive of motorcycles.

The belt length of the toothed belt 10 is, for example, 500 mm or more and 3000 mm or less. The belt width of the toothed belt 10 is, for example, 10 mm or more and 200 mm or less. The belt thickness (maximum) of the toothed belt 10 is, for example, 3 mm or more and 20 mm or less. The dimensions of the toothed belt according to the embodiment of the present invention are not limited to these ranges.

FIG. 1 shows only a part of the toothed belt 10, and the toothed belt 10 is an endless meshing transmission belt.

The toothed belt 10 has a plurality of belt teeth 12 on an inner circumferential surface thereof. As shown in FIG. 1, the toothed belt 10 includes a belt body 11, a cord 13, and a reinforcement fabric 14. In the present embodiment, the belt teeth 12 are straight teeth.

The toothed belt 10 according to the present embodiment includes the belt body 11 made of an elastomer composed of polyurethane. The belt body 11 has a flat band portion 11a having a cross-section that is horizontally elongated and rectangular, and a plurality of tooth portions 11b integrally provided on the inner circumferential side thereof. The plurality of tooth portions 11b are provided at a constant pitch in the belt length direction.

The reinforcement fabric 14 is provided so as to cover the inner circumferential surface of each tooth portion 11b. In the toothed belt 10, each belt tooth 12 is composed of the tooth portion 11b and the reinforcement fabric 14.

The tooth profile of each belt tooth 12 is a curvilinear tooth profile such as an S tooth profile.

The number of belt teeth 12 is, for example, 30 or more and 400 or less.

The tooth width of each belt tooth 12 is, for example, 2 mm or more and 10 mm or less. The tooth width of each belt tooth 12 is defined as the maximum dimension in the belt length direction (see W in FIG. 3).

The tooth height of each belt tooth 12 is, for example, 2 mm or more and 8 mm or less. The tooth height of each belt tooth 12 is defined as the dimension from a tooth bottom portion 15 between a pair of belt teeth 12 adjacent to each other in the belt length direction to the tip of the belt tooth 12 (see H in FIG. 3).

The arrangement pitch of the belt teeth 12 is, for example, 8 mm or more and 14 mm or less. The arrangement pitch of the belt teeth 12 is defined as the distance between the tips of a pair of belt teeth 12 adjacent to each other in the belt length direction (see P in FIG. 3).

The belt body 11 is preferably made of polyurethane, and is more preferably made of thermosetting polyurethane.

The thermosetting polyurethane is a cured product of a thermosetting urethane composition obtained by blending a urethane prepolymer with a curing agent, a plasticizer that is an optional component, etc.

In the case where thermosetting polyurethane is used as the material of the belt body 11, a cord or a reinforcement fabric is easily impregnated with the thermosetting urethane composition, so that the thermosetting polyurethane is suitable for producing a toothed belt in which a cord and a reinforcement fabric are impregnated with the component constituting a belt body. In the toothed belt in which the cord and the reinforcement fabric are impregnated with the component constituting the belt body, belt teeth are less likely to be chipped or worn, and the cord is less likely to be peeled from the belt body, so that the durability of the toothed belt is good.

The above urethane prepolymer is a relatively low-molecular-weight urethane compound having a plurality of NCO groups at the end thereof. The urethane prepolymer is obtained by a reaction of an isocyanate component and a polyol component.

Examples of the isocyanate component include tolylene diisocyanate (TDI), diphenylmethane diisocyanate (MDI), etc.

Examples of the polyol component include polytetramethylene ether glycol (PTMG), etc.

The urethane prepolymer may be composed of a single urethane compound, or may be composed of a mixture of multiple urethane compounds.

Examples of the above curing agent include amine compounds such as 1,4-phenylenediamine, 2,6-diaminotoluene, 1,5-naphthalenediamine, 4,4'-diaminodiphenylmethane, 3,3'-dichloro-4,4'-diaminodiphenylmethane (MOCA), and 4-chloro-3,5-diaminobenzoic acid isobutyl ester, etc. The curing agent preferably contains one or more of these.

A curing agent composed of an amine compound is preferably blended such that an a value ($NH_2$ group/NCO group), which is the ratio of the number of moles of $NH_2$ group in the curing agent to the number of moles of NCO group in the urethane prepolymer, is 0.70 or more and 1.10 or less.

Examples of the above plasticizer include: dialkyl phthalates such as dibutyl phthalate (DBP) and dioctyl phthalate (DOP); dialkyl adipates such as dioctyl adipate (DOA); dialkyl sebacates such as dioctyl sebacate (DOS); etc. The plasticizer preferably contains one or more of these.

The blending amount of the plasticizer per 100 parts by mass of the urethane prepolymer is, for example, 3 parts by mass or more and 20 parts by mass or less.

The thermosetting polyurethane preferably further contains a lubricant.

Examples of the lubricant include fatty acid esters, hydrocarbon resins, paraffins, higher fatty acids, fatty acid amides, aliphatic alcohols, metal soaps, modified silicones, etc. The lubricant preferably contains one or more of these.

In the case of containing the lubricant, the blending amount of the lubricant per 100 parts by mass of the urethane prepolymer is, for example, 3 parts by mass or more and 20 parts by mass or less.

The above thermosetting urethane composition may further contain, for example, a coloring agent, a defoaming agent, a stabilizer, etc.

The JIS-A hardness of the polyurethane constituting the belt body 11 is, for example, 85 or more and 100 or less. The JIS-A hardness of the polyurethane is preferably 90 or more and 100 or less. By setting the JIS-A hardness of the polyurethane to 90 or more, it is easy to ensure good wear resistance.

The JIS-A hardness of the polyurethane is measured using a Type A hardness test based on JIS K7312: 1996. A Type A durometer is used for the measurement.

The toothed belt 10 includes the cord 13 embedded in the flat band portion 11*a* of the belt body 11 and made of a carbon fiber.

From the viewpoint of obtaining excellent durability in high-load transmission and excellent tension maintenance in high-load transmission, the outer diameter of the cord 13 is preferably 0.6 mm or more and 2.2 mm or less, and more preferably 0.8 mm or more and 1.2 mm or less.

From the viewpoint of obtaining excellent durability in high-load transmission and excellent tension maintenance in high-load transmission, the carbon fiber constituting the cord 13 is preferably a PAN-based carbon fiber.

From the viewpoint of obtaining excellent durability in high-load transmission, the filament diameter of the carbon fiber is preferably 4 μm or more and 9 μm or less, and more preferably 6 μm or more and 8 μm or less.

From the viewpoint of obtaining excellent durability in high-load transmission and excellent tension maintenance in high-load transmission, the total number of filaments of the carbon fiber constituting the cord 13 is preferably 6000 (6K) or more and 48000 (48K) or less, more preferably 9000 (9K) or more and 18000 (18K) or less, and further preferably 12000 (12K).

From the viewpoint of obtaining excellent durability in high-load transmission and excellent tension maintenance in high-load transmission, the fineness of the carbon fiber constituting the cord 13 is preferably 400 tex or more and 3200 tex or less, more preferably 600 tex or more and 1200 tex or less, and further preferably 800 tex.

From the viewpoint of obtaining excellent durability in high-load transmission and excellent tension maintenance in high-load transmission, the cord 13 is preferably a twisted yarn. Examples of the twisted yarn constituting the cord 13 include a single twisted yarn, a plied yarn, and a Lang yarn.

From the viewpoint of obtaining excellent durability in high-load transmission and excellent tension maintenance in high-load transmission, the cord 13 of the twisted yarn is preferably a single twisted yarn in which a filament bundle of carbon fibers is twisted in one direction.

From the viewpoint of obtaining excellent durability in high-load transmission and excellent tension maintenance in high-load transmission, the twist count of the cord 13 of the single twisted yarn is preferably 4 turns/10 cm or more and 12 turns/10 cm or less, and more preferably 6 turns/10 cm or more and 10 turns/10 cm or less. For the cord 13 of the single twisted yarn, an S-twisted yarn may be used, a Z-twisted yarn may be used, or both an S-twisted yarn and a Z-twisted yarn may be used.

The cord 13 is provided so as to have a pitch in the belt width direction and form a spiral. The cord 13 may be composed of two yarns, an S-twisted yarn and a Z-twisted yarn, and may be provided such that these yarns form a double spiral.

The cord 13 is placed so as to extend in parallel at intervals in the belt width direction. In this case, from the viewpoint of obtaining excellent durability in high-load transmission and excellent tension maintenance in high-load transmission, the number of cords 13 per 10 mm of belt width is preferably 6 per 10 mm or more and 10 per 10 mm or less, and more preferably 7 per 10 mm or more and 9 per 10 mm or less.

The cord 13 is preferably subject to an adhesive treatment such as being immersed in a liquid adhesive in advance prior to molding and then dried.

The reinforcement fabric 14 may be a woven fabric or may be a knitted fabric. The reinforcement fabric 14 is preferably a woven fabric.

Examples of the reinforcement fabric 14 include a 2/2 twill-woven canvas, a 3/1 twill-woven canvas, a plain-woven canvas, a satin-woven canvas, etc., formed of warp and weft.

In the case where the reinforcement fabric 14 is one of these canvases, the fineness of each of the warp and the weft is preferably 44 to 933 dtex and more preferably 44 to 235 dtex.

The thread density of each of the warp and the weft is preferably 74 to 430 threads/5 cm width, and more preferably 132 to 174 threads/5 cm width.

The weight per unit area of the reinforcement fabric 14 is preferably 90 to 600 g/m$^2$ and more preferably 300 to 450 g/m$^2$.

The reinforcement fabric 14 is preferably provided such that one of the warp and the weft is aligned with the belt length direction.

In the case where the weft is composed of a stretchable processed yarn such as a false-twisted yarn, the reinforcement fabric 14 has anisotropy in stretch properties, and is preferably provided such that the weft is aligned with the belt length direction in order to enhance the stretch properties in the belt length direction.

Examples of the fiber material constituting the reinforcement fabric 14 include chemical fibers such as nylon fibers including nylon 6,6, nylon 4,6, and nylon 6, polyketone fibers, aramid fibers, and polyester fibers, and natural fibers such as cotton. The reinforcement fabric 14 may be composed of a single type of fiber, or may be composed of a plurality of types of fibers.

The weft in the belt circumferential direction of the reinforcement fabric 14 may be a woolly yarn. This is because woolly yarns have excellent elasticity.

The reinforcement fabric 14 may be subject to an adhesive treatment such as being immersed in an epoxy-based adhesive in advance prior to molding and then dried.

The reinforcement fabric 14 may also be subject to a wear modification treatment with a wear modifier such as fluorine resins including ultra-high-molecular-weight polyethylene (UHMWPE), polytetrafluoroethylene (PTFE), perfluoro-alkoxyalkane (PFA), perfluoroethylene-propene copolymer (FEP), ethylene-tetrafluoroethylene copolymer (ETFE), polyvinylidene fluoride (PVDF), etc.

In the wear modification treatment, for example, a binder in which the wear modifier is dispersed may be applied to the reinforcement fabric, or the reinforcement fabric before molding may be immersed in the binder.

In the toothed belt 10, the cured product of the thermosetting urethane composition has penetrated the gaps in the reinforcement fabric 14. Therefore, not only the reinforcement fabric 14 but also the cured product of the thermosetting urethane composition is exposed on the surface (inner circumferential surface) of each belt tooth 12.

A peak friction coefficient μA and an average friction coefficient μB of the toothed belt 10 measured by a method described below have a relationship of "μA−μB≤0.3" and "μB≤0.5".

Therefore, good durability can be ensured.

By setting the average friction coefficient μB to 0.5 or less, the toothed belt 10 can reduce the friction force generated between pulleys, making the belt teeth 12 less likely to wear. In addition, by reducing the friction force, the generation of heat during use can be suppressed. When the generation of heat is suppressed, peeling at the interface between the belt body 11 and the cord 13 is suppressed. As a result of these, the toothed belt 10 has good durability.

Furthermore, by not only simply decreasing the average friction coefficient μB but also setting the difference between the peak friction coefficient μA and the average friction coefficient μB to 0.3 or less, wear of the belt teeth 12 can be suppressed. If the difference between the peak friction coefficient μA and the average friction coefficient μB is large, a vibration phenomenon may occur in the belt teeth 12 when the belt teeth 12 mesh with each other, and the belt teeth 12 become more likely to wear due to this phenomenon. In contrast, by setting the difference between the peak friction coefficient μA and the average friction coefficient μB to 0.3 or less, the above vibration phenomenon can be suppressed. As a result, the belt teeth 12 become less likely to wear, and also from this point of view, the toothed belt 10 has good durability.

The lower limit of the average friction coefficient μB is preferably 0.1. It is very difficult to make the average friction coefficient μB less than 0.1.

The lower limit of the difference between the peak friction coefficient μA and the average friction coefficient μB is not particularly limited, and may be greater than 0.

Next, a method for measuring the peak friction coefficient μA and the average friction coefficient μB will be described.

Figure 4:
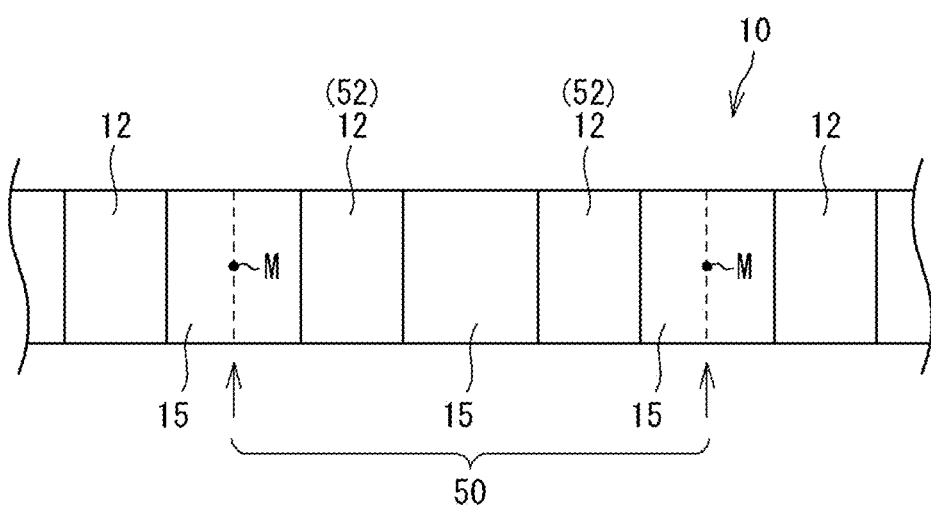
FIG. 4 is a diagram for describing a method for producing a measurement sample.

FIG. 4 is a diagram for describing a method for producing a measurement sample. FIG. 4 is a view of a part of the toothed belt 10 as seen from the inner circumferential surface side.

Figure 5:
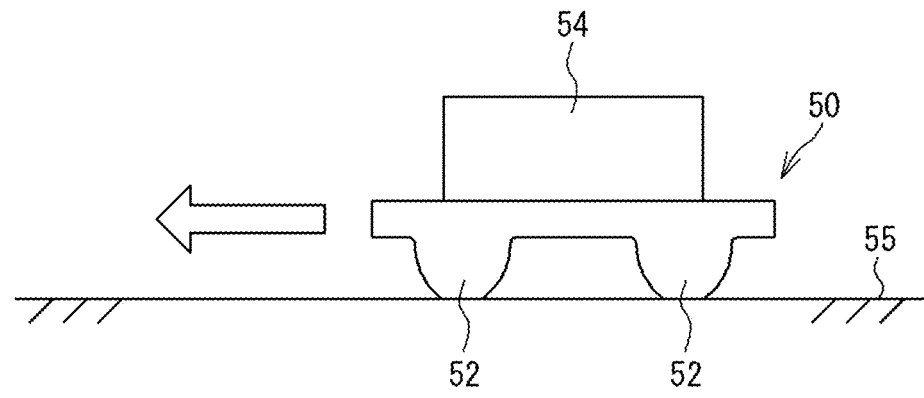
FIG. 5 is a diagram illustrating a method for measuring a friction coefficient.

FIG. 5 is a diagram illustrating a method for measuring a friction coefficient.

(Measurement Sample)

A measurement sample 50 is cut out from the toothed belt 10 by cutting the toothed belt 10 in the belt width direction.

Specifically, the toothed belt 10 is cut in the belt width direction at two locations (see arrows in FIG. 4) so as to pass through points M (see FIG. 4) each of which is the midpoint in the belt width direction between the tooth tips of adjacent belt teeth 12. At this time, the toothed belt 10 is cut so as to include two belt teeth 12.

The cut-out measurement sample 50 has a rectangular shape when viewed in the belt thickness direction, and has a length in the belt length direction that is twice an arrangement pitch P of the belt teeth 12.

(Measurement Method)

The measurement sample 50 is placed such that belt teeth 52 thereof are in contact with a flat plate 55 made of SUS304. In addition, a weight 54 is placed on the back surface of the measurement sample 50. The weight of the weight 54 is set such that the total weight of the measurement sample 50 and the weight 54 is 1000 g.

Measurement is performed in this state. Therefore, the measurement of a friction coefficient is carried out while a constant load is applied to the measurement sample 50.

Next, in a state where a constant load is applied to the measurement sample 50, the measurement sample 50 is moved at a speed of 100 mm/min in one direction for 30 seconds. The friction force at this time is measured, a friction coefficient (FA/N) calculated by dividing a maximum value FA of the friction force for 30 seconds by a normal force N is regarded as the peak friction coefficient μA, and a friction coefficient (FB/N) calculated by dividing an average value FB of the friction force for 30 seconds by the normal force N is regarded as the average friction coefficient μB.

The measurement is performed three times, and the average of the three measurements is used as a measured value.

In the measurement of the frictional force, the measurement environment is as follows.

The temperature is 23±5° C.

The humidity is 50±5%.

The surface roughness of the flat plate made of SUS304 is 1.6 μm or less as Ra (arithmetic mean roughness).

The measurement of the friction force is carried out using a surface property measuring instrument, TYPE: 14, manufactured by Shinto Scientific Co., Ltd.

In the toothed belt 10, the reinforcement fabric 14 is provided so as to cover the inner circumferential surface of each tooth portion 11*b*. This also improves the wear resistance of the belt teeth 12.

The toothed belt 10 according to the present embodiment is, for example, wound around a pair of pulleys to transmit power from a drive source to the driven side. Here, the outer diameter of each pulley is, for example, 20 to 700 mm. In addition, the belt running speed is, for example, 10 to 2000 m/min, and the transmission capacity is, for example, 0.1 to 600 kW.

Next, a method for producing the toothed belt 10 according to the embodiment will be described.

Figure 6:
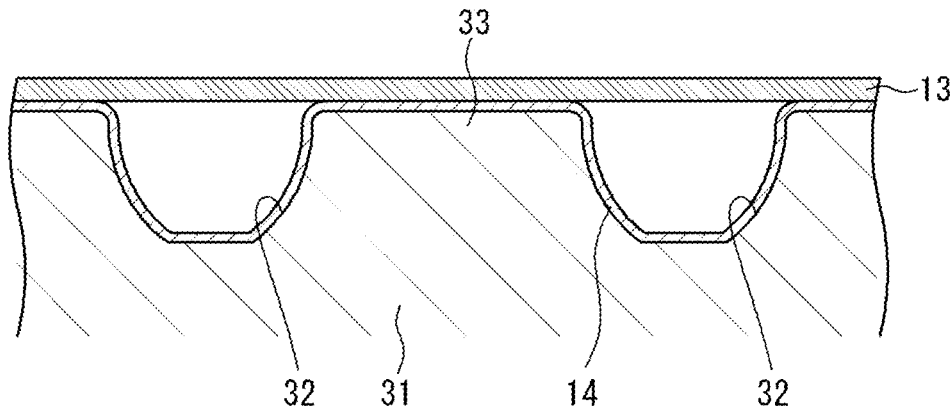
FIG. 6 is a diagram illustrating a method for producing the toothed belt according to the first embodiment.
Figure 7:
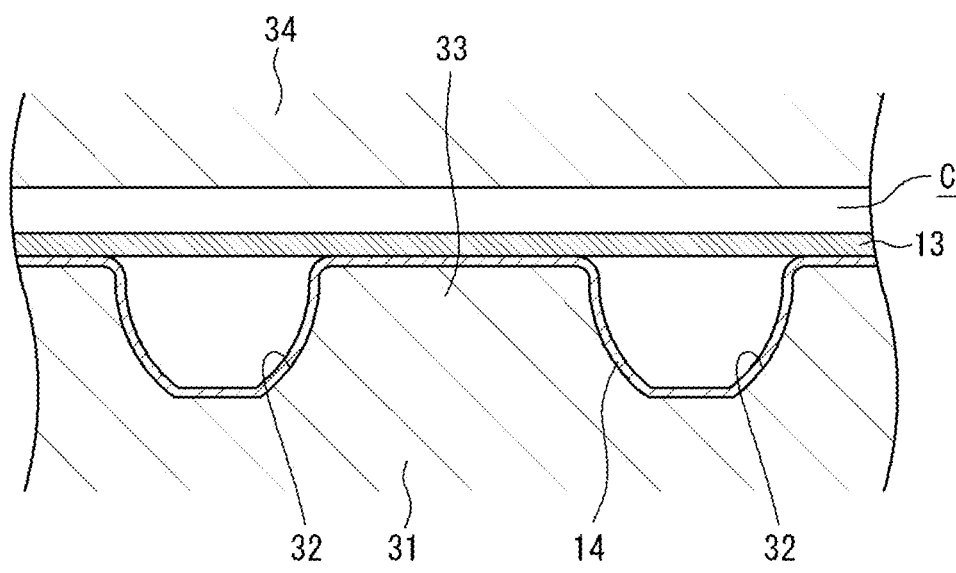
FIG. 7 is a diagram illustrating the method for producing the toothed belt according to the first embodiment.
Figure 8:
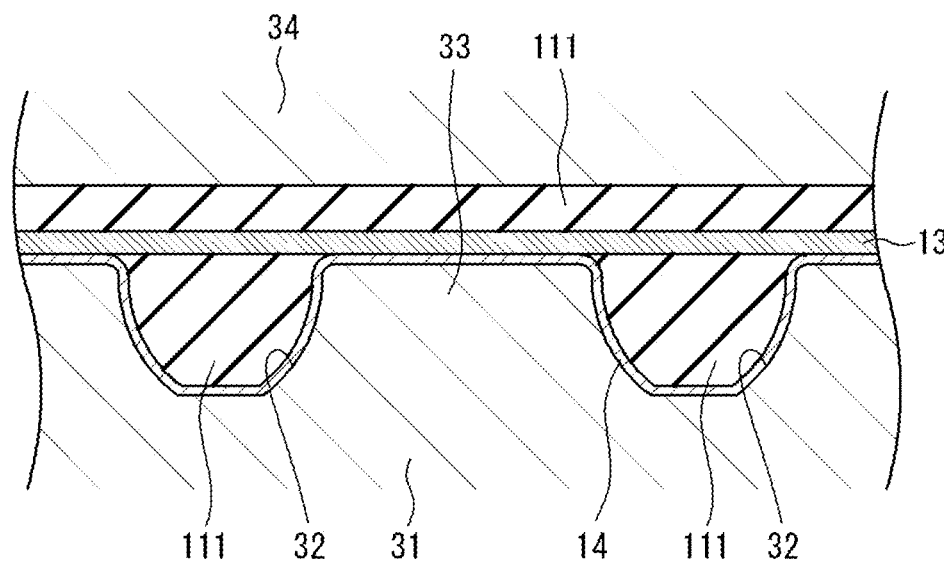
FIG. 8 is a diagram illustrating the method for producing the toothed belt according to the first embodiment.

FIG. 6 to FIG. 8 are diagrams for describing the method for producing the toothed belt 10. FIG. 6 to FIG. 8 show parts of a mold and a belt.

(1) As shown in FIG. 6, the reinforcement fabric 14 processed into a tubular shape is sequentially overlaid on a cylindrical inner mold 31, and the cord 13 is spirally wound thereon.

On the outer circumference of the inner mold 31, recessed grooves 32 each having a cross-section with a shape corresponding to the belt teeth 12 and extending in the axial direction are provided at a constant pitch so as to be spaced apart in the circumferential direction, and a projection 33 is provided between adjacent recessed grooves 32.

The reinforcement fabric 14 processed into a tubular shape is molded in advance so as to fit the shapes of the recessed grooves 32.

(2) Next, as shown in FIG. 7, the inner mold 31 is placed in a cylindrical outer mold 34. At this time, a cavity C for forming a belt body is formed between the inner mold 31 and the outer mold 34.

(3) Subsequently, as shown in FIG. 8, a thermosetting urethane composition 111 containing the urethane prepolymer, etc., is injected into the sealed cavity C to fill the cavity C, and is heated.

At this time, the thermosetting urethane composition 111 flows and hardens, thereby forming belt tooth portions at the recessed grooves 32 and tooth bottom portions at the projections 33.

At this time, although not shown, the thermosetting urethane composition 111 hardens while penetrating the gaps in the reinforcement fabric 14. Therefore, a cured product of the thermosetting urethane composition 111 is exposed on the inner circumferential surfaces of the belt teeth 12 together with the reinforcement fabric 14.

Thus, a cylindrical slab in which the belt body 11, the cord 13, and the reinforcement fabric 14 are integrated is molded. The molding conditions are, for example, a molding temperature of 170° C., a molding pressure of 12 MPa, and a molding time of 20 minutes.

Finally, the slab is removed from the inner mold 31 and the outer mold 34 and cut into rings, whereby the toothed belt 10 according to the present embodiment can be obtained.

Second Embodiment

Figure 9:
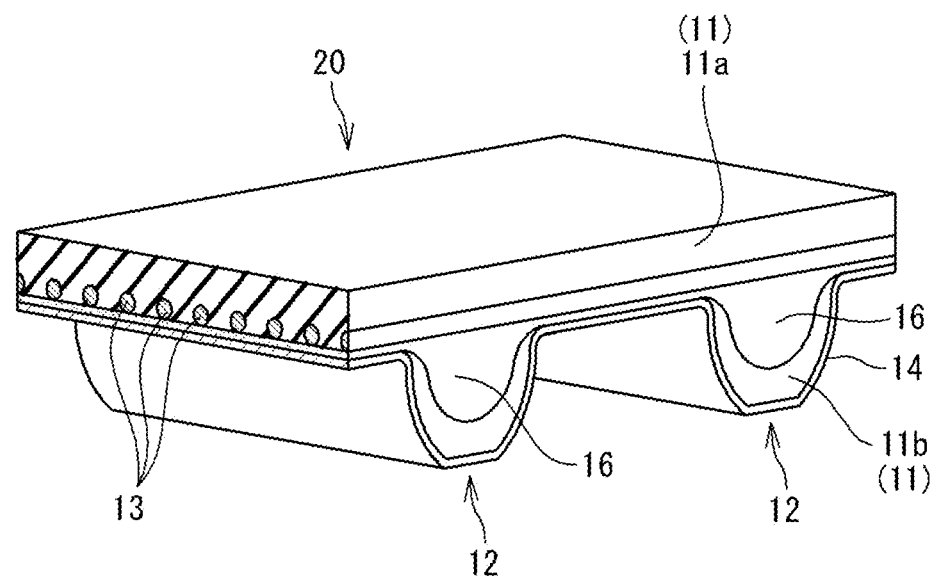
FIG. 9 is a perspective view schematically showing a toothed belt according to a second embodiment.

The toothed belt according to the embodiment of the present invention may have a configuration as in a toothed belt 20 shown in FIG. 9.

The toothed belt 20 according to the present embodiment is different from the toothed belt 10 according to the first embodiment in including a nonwoven fabric 16 embedded along the belt length direction on the inner circumferential side with respect to the embedded position of the cord 13 in the belt thickness direction in the belt body 11.

The toothed belt 20 has the same configuration as the toothed belt 10, except that the nonwoven fabric 16 is included.

Since the toothed belt 20 includes the nonwoven fabric 16, the rigidity of the tooth portions is increased, so that improvement of durability under high loads can be expected.

In the toothed belt 20, the nonwoven fabric 16 may be composed of a single sheet, or may be composed of a plurality of sheets.

The nonwoven fabric 16 is provided so as to include the polyurethane constituting the belt body 11 and form a layer in a side view. The portion, of the nonwoven fabric 16, corresponding to each tooth portion 11b enters the tooth portion 11b so as to bulge on the inner circumferential side in a side view and extends thickly in the belt thickness direction. The portions of the nonwoven fabric 16 between the tooth portions 11b are in contact with the cord 13 and are compressed thinly in the belt thickness direction.

Examples of the fiber material constituting the nonwoven fabric 16 include nylon fibers, polyester fibers, aramid fibers, polyketone fibers, carbon fibers, etc. The nonwoven fabric 16 may be formed from a single type of fiber, or may be formed from a plurality of types of fibers.

The nonwoven fabric 16 may be subject to an adhesive treatment such as being immersed in a liquid adhesive in advance prior to molding and then dried.

As a method for producing the toothed belt 20 including the nonwoven fabric 16 according to the present embodiment, for example, a method that is the same as the method employed in the first embodiment except that a part of the production step of the toothed belt 10 according to the first embodiment is modified, may be employed.

Specifically, the production may be carried out by modifying the step (1) described with reference to FIG. 6 such that the reinforcement fabric 14 and the nonwoven fabric 16 processed into a tubular shape are sequentially overlaid on the cylindrical inner mold 31 and the cord 13 is spirally wound thereon.

In this case, as the nonwoven fabric 16, a fabric having a length that allows slight tension to be applied thereto in the circumferential direction when overlaid on the cylindrical inner mold 31 is preferably used.

In addition, a thermosetting urethane composition is injected for filling, and is heated, whereby the nonwoven fabric 16 is impregnated with the thermosetting urethane composition and the thermosetting urethane composition hardens, so that the nonwoven fabric 16 is placed along the belt length direction, including the thermosetting polyurethane, and is embedded in the belt body 11.

OTHER EMBODIMENTS

The belt teeth of the toothed belt according to the embodiment of the present invention is not limited to the straight teeth, and may be helical teeth.

In the case where the belt teeth are helical teeth, a method for producing a measurement sample is as described above.

Therefore, in the case where the belt teeth are helical teeth, depending on the direction of the tooth trace, the toothed belt may be cut so as to pass through not only a tooth bottom portion but also a part of the belt teeth when the toothed belt is cut in the belt width direction.

In the toothed belt according to the embodiment of the present invention, the tooth profile of each belt tooth may be a trapezoidal tooth profile.

In the toothed belt according to the embodiment of the present invention, the belt body may be composed of thermoplastic polyurethane or the like.

The cord included in the toothed belt may be composed of an organic fiber such as aramid fibers, polyester fibers, PBO fibers, nylon fibers, and polyketone fibers, a glass fiber, a metal fiber, or the like.

EXAMPLES

Hereinafter, the embodiment of the present invention will be more specifically described by means of examples, but the embodiment of the present invention is not limited to the examples below.

Toothed belts were produced in Examples 1 to 3 and Comparative Examples 1 and 2, respectively.

Example 1

An S8M toothed belt having the same configuration as in the first embodiment was produced.

The toothed belt of Example 1 had a belt length of 800 mm, a belt thickness (maximum) of 4.8 mm, and a belt width of 8 mm. The belt teeth were S8M as specified in ISO 13050:2014 (E), and the arrangement pitch thereof was 8 mm.

As the thermosetting urethane composition forming the belt body, a thermosetting urethane composition in which 16 parts by mass of a curing agent (4-chloro-3,5-diaminobenzoic acid isobutyl ester) and 7.5 parts by mass of a lubricant (fatty acid ester) were blended per 100 parts by mass of a urethane prepolymer (PTMEG-TDI) for which tolylene diisocyanate was used as an isocyanate component and polytetramethylene ether glycol was used as a polyol component, was used.

The JIS-A hardness of the cured product of the thermosetting urethane composition was 95.

As described above, the JIS-A hardness of the cured product of the thermosetting urethane composition was measured using a type A durometer based on JIS K7312:

1996. The method for measuring the JIS-A hardness is the same for Examples 2 and 3 and Comparative Examples 1 and 2.

For the cord, a single twisted yarn obtained by twisting a filament bundle of a carbon fiber (Tenax-J UTS50 F22, manufactured by TEIJIN LIMITED, 12K, 800 tex, filament diameter: 7.0 μm) having 12000 filaments, in one direction with 90 tpm as the twist count per meter of length, was used. For the cord of the single twisted yarn, an S-twisted yarn and a Z-twisted yarn were prepared.

These yarns were subject to an adhesive treatment of immersion in an adhesive and then drying. Here, a phenol-based adhesive was used as an adhesive.

The cord of the single twisted yarn composed of the S-twisted yarn and the Z-twisted yarn was provided such that these yarns were arranged alternately in the belt width direction to form a double spiral.

The number of cords per 10 mm of the belt width was 8.

As the canvas (reinforcement fabric), a 2/2 twill-woven canvas formed with weft of one fiber bundle of nylon 6,6 fiber having a fineness of 235 dtex and warp of three fiber bundles having the same fineness of 235 dtex was used.

The canvas was provided such that the weft was aligned with the belt length direction.

The canvas was not subject to an adhesive treatment.

The canvas had a thickness of 1.2 mm, a warp thread density of 113 threads/5 cm width, a weft thread density of 120 threads/5 cm width, and a weight per unit area of 385 g/m².

When the peak friction coefficient μA and the average friction coefficient μB were measured by the above-described method for the produced toothed belt, the peak friction coefficient μA was 0.24 and the average friction coefficient μB was 0.21.

Example 2

An S8M toothed belt was produced in the same manner as Example 1, except that the thermosetting urethane composition was changed as described below.

As the thermosetting urethane composition forming the belt body, a thermosetting urethane composition in which 16 parts by mass of a curing agent (3,3'-dichloro-4,4'-diaminodiphenylmethane (MOCA)) and 7.5 parts by mass of a lubricant (fatty acid ester) were blended per 100 parts by mass of a urethane prepolymer (PTMEG-TDI) for which tolylene diisocyanate was used as an isocyanate component and polytetramethylene ether glycol was used as a polyol component, was used.

The JIS-A hardness of the cured product of the thermosetting urethane composition as measured based on JIS K7312: 1996 was 95.

When the peak friction coefficient μA and the average friction coefficient μB were measured by the above-described method for the produced toothed belt, the peak friction coefficient μA was 0.71 and the average friction coefficient μB was 0.49.

Example 3

An S8M toothed belt was produced in the same manner as Example 1, except that the thermosetting urethane composition and the canvas were changed as described below.

As the thermosetting urethane composition forming the belt body, a thermosetting urethane composition in which 16 parts by mass of a curing agent (3,3'-dichloro-4,4'-diaminodiphenylmethane (MOCA)) was blended per 100 parts by mass of a urethane prepolymer (PTMEG-TDI) for which tolylene diisocyanate was used as an isocyanate component and polytetramethylene ether glycol was used as a polyol component, was used.

The JIS-A hardness of the cured product of the thermosetting urethane composition as measured based on JIS K7312: 1996 was 98.

As the canvas, a canvas that is the same as in Example 1 and that was subject to a wear modification treatment with ultra-high-molecular-weight PE powder was used.

As the wear modification treatment, a mixture of thermoplastic polyamide powder and ultra-high-molecular-weight PE powder was applied to the canvas and then heat-welded.

When the peak friction coefficient μA and the average friction coefficient μB were measured by the above-described method for the produced toothed belt, the peak friction coefficient μA was 0.25 and the average friction coefficient μB was 0.08.

Comparative Example 1

An S8M toothed belt was produced in the same manner as Example 1, except that the thermosetting urethane composition was changed as described below.

As the thermosetting urethane composition forming the belt body, a thermosetting urethane composition in which 16 parts by mass of a curing agent (4-chloro-3,5-diaminobenzoic acid isobutyl ester) was blended per 100 parts by mass of a urethane prepolymer (PTMEG-TDI) for which tolylene diisocyanate was used as an isocyanate component and polytetramethylene ether glycol was used as a polyol component, was used.

The JIS-A hardness of the cured product of the thermosetting urethane composition as measured based on JIS K7312: 1996 was 98.

When the peak friction coefficient μA and the average friction coefficient μB were measured by the above-described method for the produced toothed belt, the peak friction coefficient μA was 0.89 and the average friction coefficient μB was 0.70.

Comparative Example 2

An S8M toothed belt was produced in the same manner as Example 1, except that the thermosetting urethane composition was changed as described below.

As the thermosetting urethane composition forming the belt body, a thermosetting urethane composition in which 16 parts by mass of 3,3'-dichloro-4,4'-diaminodiphenylmethane (MOCA) as a curing agent was blended per 100 parts by mass of a urethane prepolymer (PTMEG-TDI) for which tolylene diisocyanate was used as an isocyanate component and polytetramethylene ether glycol was used as a polyol component, was used.

The JIS-A hardness of the cured product of the thermosetting urethane composition as measured based on JIS K7312: 1996 was 98.

When the peak friction coefficient μA and the average friction coefficient μB were measured by the above-described method for the produced toothed belt, the peak friction coefficient μA was 0.80 and the average friction coefficient μB was 0.46.

(Evaluation)

<Load Durability Test>

Figure 10:
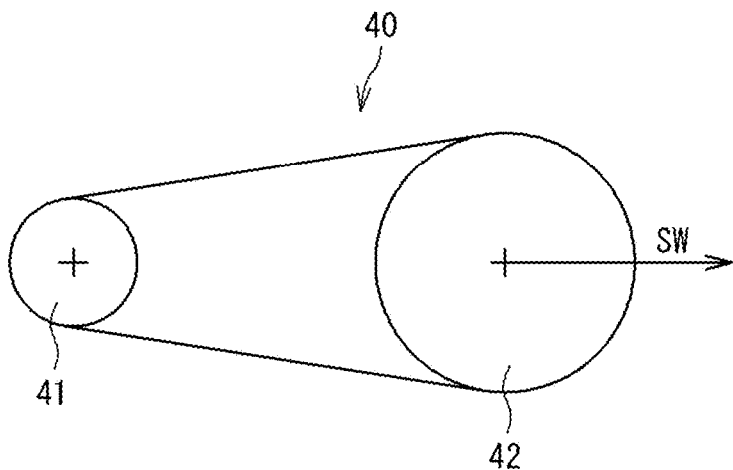
FIG. 10 is a diagram showing a pulley layout of a belt durability tester for a load durability test.

FIG. 10 shows a pulley layout of a belt durability tester for a load durability test. This belt durability tester 40 is configured such that a drive pulley 41 having 22 teeth and an outer diameter of 54.65 mm and a driven pulley 42 having 33 teeth and an outer diameter of 82.66 mm are placed at an interval in the horizontal direction and an axial load (SW) can be applied to the lateral side of the driven pulley 42.

Each of the toothed belts of the examples and the comparative examples was wound around the drive pulley 41 and the driven pulley 42 of the belt durability tester 40, and a torque of 34.24 N·m was applied to the driven pulley 42 together with an axial load (SW) of 608 N. The axial load (SW) was set as an axial load by a load cell. During setting, tension was set to the target tension, the pulleys were then rotated by hand for three turns, and the tension was set to the target tension again. Then, at an ambient temperature of 60° C., the drive pulley 41 was rotated at a speed of 4212 rpm and the driven pulley 42 was rotated at a speed of 2808 rpm to cause the belt to run.

Then, while the belt was stopped periodically and visually observed, the belt running was continued until a failure such as chipping or wear of the belt teeth and peeling between the belt body and the cord occurred. The results are shown in Table 1.

TABLE 1

|  | Example 1 | Example 2 | Example 3 | Comparative Example 1 | Comparative Example 2 |
|---|---|---|---|---|---|
| Peak friction coefficient μA | 0.24 | 0.71 | 0.25 | 0.89 | 0.80 |
| Average friction coefficient μB | 0.21 | 0.49 | 0.08 | 0.70 | 0.46 |
| μA − μB | 0.03 | 0.22 | 0.17 | 0.19 | 0.34 |
| Durability time (h) | 330 | 133 | 213 | 26 | 42.3 |
| Failure mode | Tooth chipping | Tooth chipping | Wear | Peeling | Wear |

As shown in Table 1, it was found that the toothed belt according to the embodiment of the present invention has a long durability time until a failure occurs, and has excellent durability.

In the load durability test for Examples 1 and 2, the belt teeth were less likely to wear, and the test ended due to chipping of the belt teeth.

In the load durability test for Example 3, the belt teeth were less likely to wear, but after the reinforcement fabric was completely worn away, the test ended due to wear of the belt teeth.

On the other hand, in the load durability test for Comparative Example 1, the amount of heat generated in the belt body increased, and the test ended due to peeling at the interface between the belt body and the cord.

In the load durability test for Comparative Example 2, the test ended due to wear of the belt teeth.

REFERENCE SIGNS LIST

10, 20 toothed belt
11 belt body
11*a* flat band portion

11*b* tooth portion
12, 52 belt teeth
13 cord
14 reinforcement fabric
15 tooth bottom portion
16 nonwoven fabric
31 inner mold
32 recessed groove
33 projection
34 outer mold
40 belt durability tester
41 drive pulley
42 driven pulley
50 measurement sample
54 weight
55 flat plate
111 thermosetting urethane composition
C cavity

The invention claimed is:

1. A toothed belt comprising:
a belt body having a plurality of tooth portions provided on a belt inner circumference at a constant pitch; and
a cord embedded in the belt body so as to have a pitch in a belt width direction, wherein
a peak friction coefficient μA and an average friction coefficient μB measured by the following method have a relationship of μA−μB≤0.3 and μB≤0.5:
<Measurement Method>
the toothed belt is cut in the width direction to cut out a measurement sample having two belt teeth from the toothed belt, the obtained measurement sample is placed on a flat plate such that the belt teeth are in contact with the flat plate, the measurement sample is moved in one direction for 30 seconds in this state, a friction force at this time is measured, a friction coefficient calculated by dividing a maximum value of the friction force for 30 seconds by a normal force is regarded as the peak friction coefficient μA, and a friction coefficient calculated by dividing an average value of the friction force for 30 seconds by the normal force is regarded as the average friction coefficient μB,
a measurement environment has a temperature of 23±5° C. and a humidity of 50±5%,
the measurement sample is placed on the flat plate while a constant load is applied thereto,
the flat plate is made of SUS304, and a surface roughness of a surface of the flat plate on which the measurement sample is placed is 1.6 μm or less as Ra (arithmetic mean roughness), and
a movement speed of the measurement sample is 100 mm/min.

2. The toothed belt according to claim 1, wherein a reinforcement fabric is provided on inner circumferential surfaces of the tooth portions.

3. The toothed belt according to claim 1, wherein the belt body is made of thermosetting polyurethane.

4. The toothed belt according to claim 3, wherein the belt body contains a lubricant.

* * * * *